J. GIMLICH.
Beer-Coolers.
No. 139,310.  Patented May 27, 1873.
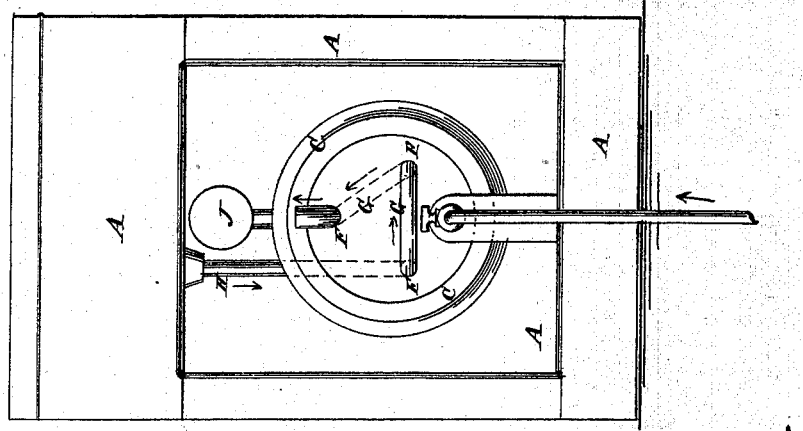
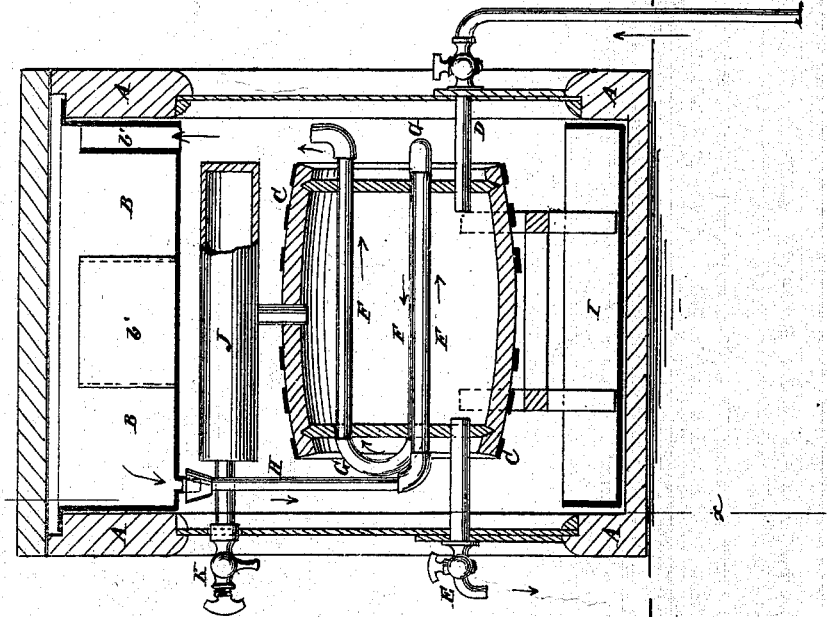
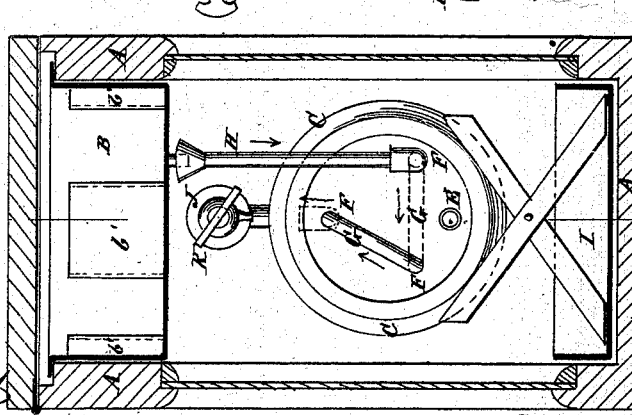
Witnesses:
A. W. Almqvist
Sedgwick
Inventor:
J. Gimlich
Per
Attorneys.

UNITED STATES PATENT OFFICE.

JACOB GIMLICH, OF PITTSFIELD, MASSACHUSETTS.

IMPROVEMENT IN BEER-COOLERS.

Specification forming part of Letters Patent No. 139,310, dated May 27, 1873; application filed April 19, 1873.

*To all whom it may concern:*

Be it known that I, JACOB GIMLICH, of Pittsfield, in the county of Berkshire and State of Massachusetts, have invented a new and useful Improvement in Beer-Cooler, of which the following is a specification:

Figure 1 is an end view of my improved apparatus partly, in section through the line $x\ x$, Fig. 2. Fig. 2 is a sectional view of the same, taken through the line $y\ y$, Fig. 1. Fig. 3 is an end view of the same.

Similar letters of reference indicate corresponding parts.

My invention has for its object to furnish an improved apparatus for cooling beer, mineral-water, &c., which shall be so constructed as to thoroughly cool the beer without injuring its flavor.

The invention consists in the cask provided with three or more wooden tubes, the flexible end-pipes, the inlet-pipe, the outlet-pipe or faucet, the ice-water inlet-pipe, and the air-chamber, in combination with the ice-box and ice-chamber, as hereinafter fully described.

A represents a box, in the upper part of which is placed an ice-chamber, B. In the box A, beneath the ice-chamber B, is placed a cask, C, to receive the beer from a cask placed in the cellar or other convenient place. The beer is introduced into the cask C, through a pipe D, inserted in one of its ends, and which is connected with the beer-cask by a flexible pipe, through which the beer is forced by an ordinary beer-pump. The beer is drawn from the cask C, through a stop-cock, E, inserted in one of its ends. F are three or more wooden tubes passing through the cask C from end to end, and which should be placed at different heights in said cask. The ends of the tubes F, that project from the heads of the cask C, are connected alternately by flexible-tubes G, so as to form a continuous pipe. H is a pipe, the lower end of which is connected with the end of the lowest tube F, and its upper end extends up nearly to the ice-chamber B, and is made funnel-shaped to receive the ice-water from the discharge-pipe of the said ice-chamber. By this arrangement the ice-water is introduced into the lowest tube F, and escapes from the highest, the discharging end of said highest tube being provided with a short elbow-pipe so that the said tube may be always full. As the ice-water escapes from the discharging end of the highest tube, F, it falls into the receiving-pan I, whence it may be withdrawn when desired. The pan I may, if desired, be used as a cooler for bottles of wine, &c. J is an air-chamber placed in the box A, above the cask C, and below the ice-chamber B, and which is connected with the said cask C by a short pipe. The air-chamber J is designed to receive any excess of gas that may be in the cask C, and which might prevent the said cask from being readily filled. The air-chamber J is provided with a blow-off cock, K, through which the gas may be allowed to escape when desired. The ice-chamber B is provided with several openings $b'$, leading into the lower part of the ice-box A, to allow the cold air to circulate freely around the cask C.

Having thus described my invention, I claim as new and desire to secure by Letters Patent—

The cask C, provided with three or more wooden tubes F, the flexible end pipes G, the inlet-pipe D, the outlet-pipe or faucet E, the pipe H, and the air-chamber J, in combination with the ice-box A, and ice-chamber B, substantially as herein shown and described, and for the purpose set forth.

JACOB GIMLICH.

Witnesses:
JOHN WHITE,
LOUIS ROEHM.